United States Patent [19]

Rauskolb et al.

[11] Patent Number: 4,649,422
[45] Date of Patent: Mar. 10, 1987

[54] METHOD OF AND ARRANGEMENT FOR DETERMINING THE SHARPNESS OF ORIGINALS FOR REPRODUCTION

[75] Inventors: Wilfried Rauskolb; Helmut Treiber; Wilhelm Nitsch, all of Munich, Fed. Rep. of Germany

[73] Assignee: Agfa-Gevaert Aktiengesellschaft, Leverkusen, Fed. Rep. of Germany

[21] Appl. No.: 706,499

[22] Filed: Feb. 28, 1985

[30] Foreign Application Priority Data

Mar. 9, 1984 [DE] Fed. Rep. of Germany ....... 3408765

[51] Int. Cl.⁴ .............................................. G03F 3/08
[52] U.S. Cl. ..................................... 358/76; 358/284; 355/41
[58] Field of Search ................... 358/76, 54, 214, 283, 358/284; 355/41

[56] References Cited

U.S. PATENT DOCUMENTS

| | | | |
|---|---|---|---|
| 4,364,084 | 12/1982 | Akimoto | 358/76 |
| 4,379,632 | 4/1983 | Dedden | 355/41 |
| 4,496,983 | 1/1985 | Takenaka | 358/76 |
| 4,531,150 | 7/1985 | Amano | 358/76 |
| 4,591,923 | 5/1986 | Urabe | 358/284 |

*Primary Examiner*—Michael A. Masinick
*Attorney, Agent, or Firm*—Peter K. Kontler

[57] ABSTRACT

An original to be reproduced is scanned line-by-line, and a scanning signal is generated for each linear, scanned region. The scanning signals represent the densities of the respective regions. A portion of each scanning signal is filtered to remove the higher frequencies. The filtered signal is differentiated to yield first density gradients, and the extreme positive and negative values of the first density gradients are determined for each region. Another portion of each scanning signal is differentiated without first removing the higher frequencies thereby yielding second density gradients. The extreme positive and negative values of the second density gradients are likewise determined for each region. A ratio of the extreme positive second density gradient to the extreme positive first density gradient is formed for each region, as is a ratio of the magnitude of the extreme negative second density gradient to the magnitude of the extreme negative first density gradient. A pair of sharpness values is then established for each region by subtracting 1 from the respective ratios. All of the sharpness values are now grouped according to the second density gradients or, alternatively, according to the second density gradients, as well as the density ranges of the respective scanned regions. The magnitudes of the sharpness values in each group are summed, and the sums compared with respective reference values. The original is classified as to its sharpness depending upon the results of the comparison so that a judgment may be made as to whether the original is worthwhile reproducing.

26 Claims, 8 Drawing Figures

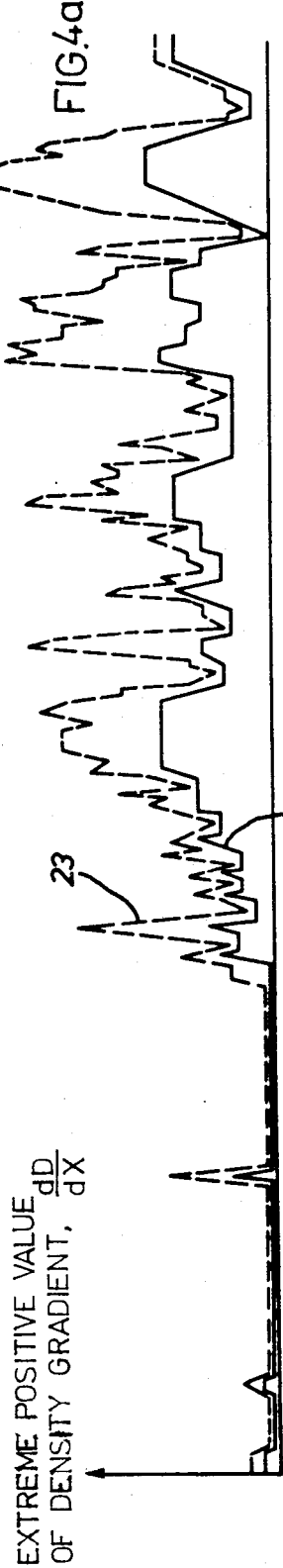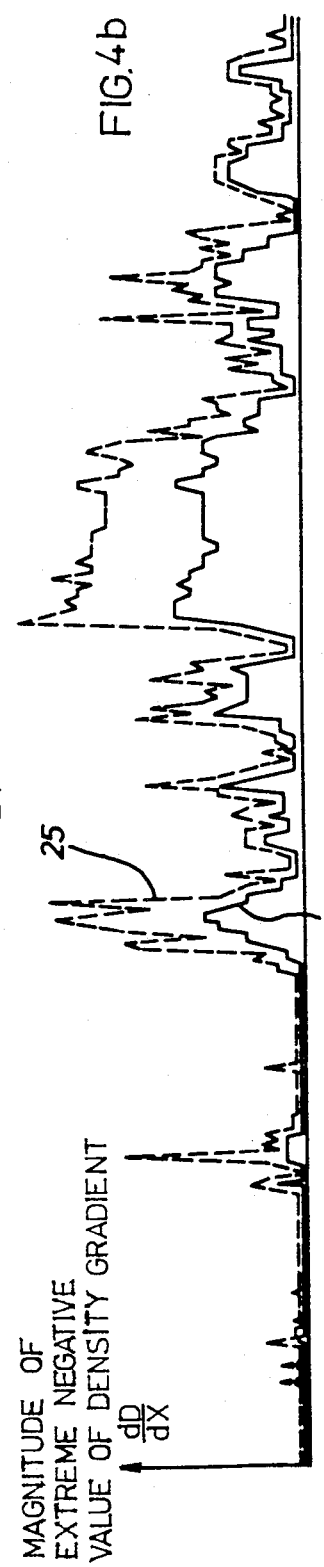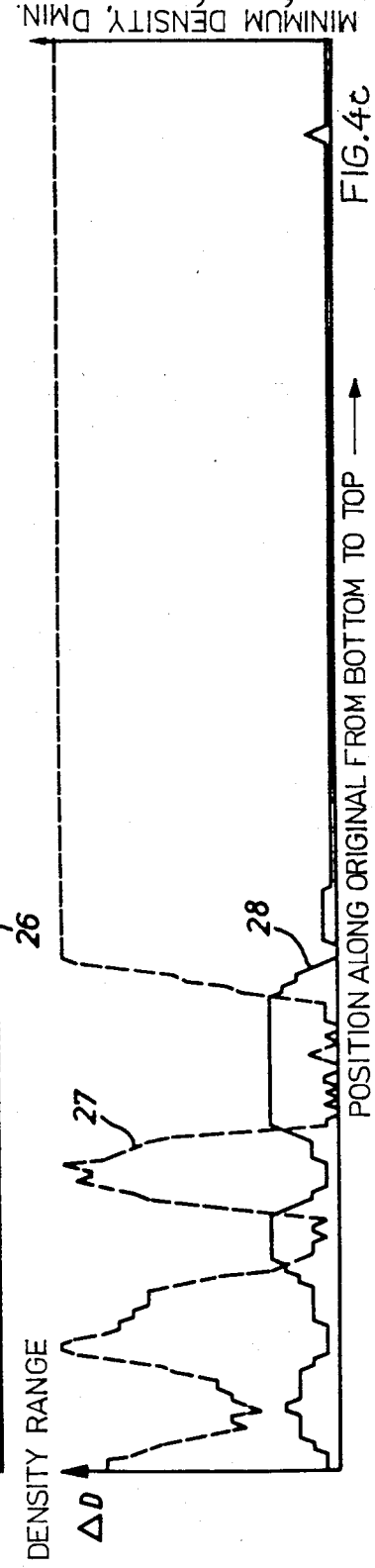

METHOD OF AND ARRANGEMENT FOR DETERMINING THE SHARPNESS OF ORIGINALS FOR REPRODUCTION

BACKGROUND OF THE INVENTION

The invention relates to a method of and an arrangement for determining the degree of sharpness of an original, e.g., an exposed and developed negative. A determination of the degree of sharpness may be of importance, for example, in making a decision as to whether reproduction of the original is worthwhile.

The West German Offenlegungsschrift No. 26 54 943, and the corresponding, commonly-assigned U.S. Pat. No. 4,379,632, disclose a method of distinguishing between sharp and fuzzy originals. An original is photoelectrically scanned line-by-line in such a manner that the width of each linear, scanned region equals or approximates the size of the smallest visually observable detail of the original. A scanning signal is generated and represents the density of the original. The scanning signal is divided into two parts, and one of these parts is filtered to eliminate the high frequency range thereof so that it resembles a signal derived from a fuzzy original. In this manner, the initial scanning signal is processed to yield a first signal having a relatively large bandwidth, and a second signal having a relatively small bandwidth.

Each of the signals obtained from the initial scanning signal is differentiated, and the maximum values of the differentials are ascertained. The maximum values of the respective differentials represent the maximum density gradients of the corresponding signals. A ratio Qv is established for the respective original and equals the ratio of the maximum density gradients of the first and second signals. This ratio is compared with a reference value, and a final determination as to the sharpness of the original, or possibly only a portion of the original, is made based on the results of the comparison. The original is judged to be sharp when the magnitude of the ratio exceeds the reference value.

The above method of analyzing the scanning signals in order to determine the sharpness of an original is susceptible to error. For example, an erroneous conclusion may be reached when a dust particle having well-defined edges and a high density at its center is present on the original and is detected during the scanning operation.

Another consideration in distinguishing between sharp and fuzzy originals is that the operators of copying apparatus are very interested in avoiding the copying of fuzzy originals since this enables labor and material costs to be reduced. On the other hand, care must be taken not to classify borderline originals which can still yield relatively good copies as fuzzy because this reduces the number of originals copied and may lead to customer complaints. Accordingly, efforts are made to prevent borderline originals capable of yielding relatively good copies from being classified as fuzzy under any circumstances. To this end, the examination of originals for sharpness is preferably performed in such a manner that borderline originals are classified as sharp even though this may result in improper classification of some fuzzy originals as sharp.

OBJECTS AND SUMMARY OF THE INVENTION

It is an object of the invention to provide a method which permits a better distinction between sharp and fuzzy originals to be achieved than is possible with the method of the above-referenced, commonly-assigned U.S. Pat. No. 4,379,632.

Another object of the invention is to provide a method which makes it possible to reduce the likelihood of improper classification of borderline originals capable of yielding relatively good copies.

An additional object of the invention is to provide an arrangement which makes it possible to distinguish between sharp and fuzzy originals more accurately than can be done with the arrangement of the above-referenced, commonly-assigned U.S. Pat. No. 4,379,632.

A further object of the invention is to provide an arrangement which makes it possible to reduce the likelihood of improper classification of borderline originals capable of yielding relatively good copies.

The preceding objects, as well as others which will become apparent as the description proceeds, are achieved by the invention.

As outlined earlier, the commonly-assigned U.S. Pat. No. 4,379,632 defines a ratio Qv which is compared with a reference value in order to ascertain the sharpness of an original. The ratio Qv is the ratio of the maximum density gradient of a signal having a relatively large bandwidth to the maximum density gradient of a signal having a relatively small bandwidth.

The invention is based on the recognition that optimum results cannot be achieved by using a single reference value for a variety of originals which have different textures and are darkened to varying degrees. Thus, for a flat original having a small density range, it has been found that a ratio Qv having a value slightly greater than 1 can indicate that the original is worthwhile copying. On the other hand, a ratio Qv with a significantly higher value can be obtained for fuzzy originals having a large density range and a high maximum density.

One aspect of the invention resides in a method of determining the sharpness of an original. The method comprises the following steps:

A. Scanning a series of linear regions of the original, i.e., scanning the original line-by-line. The original may have a transverse dimension, and each of the linear, scanned regions preferably traverses at least one-half of this dimension. It is further preferred for the width of each region to equal or approximate the size of the smallest visually observable detail of the original. The scanning step is advantageously performed photoelectrically.

B. Generating a scanning signal for each of the regions which is representative of the density of the respective region.

C. Processing each of the scanning signals to yield a sharp signal and a fuzzy signal. The processing step may include dividing each scanning signal into a pair of signals, and filtering the high frequency range of one signal of each pair to thereby obtain the respective fuzzy signal. The other signal of each pair may then constitute the respective sharp signal. When the processing step is performed by dividing each scanning signal into a pair of signals, and filtering out the high frequency range of one signal of each pair, each of the sharp signals will have a larger bandwidth than the corresponding fuzzy signal.

D. Deriving a maximum density gradient from each of the sharp signals and each of the fuzzy signals. The deriving step may comprise differentiating the respective sharp and fuzzy signals.

E. Establishing a series of first values from the maximum density gradients. The establishing step includes calculating the ratio between the maximum density gradient of each sharp signal and the maximum density gradient of the corresponding fuzzy signal.

F. Classifying the original as to its degree of sharpness by comparing the first values with respective reference values which are a function of the density gradients of the sharp signals. The first values and reference values are preferably selected in such a manner that the original is classified as sharp when at least one of the first values exceeds the respective reference value.

In accordance with the method of the invention, a multiplicity of regions of an original are scanned, and an individual value is established for each region. The values obtained for the various regions are then evaluated statistically. This procedure makes it possible to eliminate, or at least to reduce, the effects of misleading individual measurements such as, for example, measurements obtained from dust particles which are present on the original.

Another feature of the method according to the invention resides in that the reference values are a function of the magnitudes of the density gradients of the sharp signals, i.e., the signals of larger bandwidth. This enables different reference values to be employed for differently textured originals.

The method of the invention makes it possible to greatly increase the reliability of detecting fuzzy originals. Simultaneously, the proportion of originals which are improperly classified as fuzzy may be substantially reduced.

Another aspect of the invention resides in an arrangement for determining the sharpness of an original. The arrangement comprises the following:

A. Scanning means for scanning linear regions of the original, i.e., for scanning the original line-by-line, and generating scanning signals representative of the densities of the respective regions. The scanning means is advantageously designed such that each linear, scanned region traverses at least one-half of a transverse dimension of the original, and such that the width of each region equals or approximates the size of the smallest visually observable detail of the original. The scanning means preferably includes a charge-coupled device having a linear array of sensing elements. Conveying means may be provided to advance the original along a predetermined direction and, under such circumstances, the charge-coupled device may be arranged transverse to the predetermined direction. It is further preferred for the scanning means to comprise a support for the original.

B. Evaluating means for evaluating the scanning signals so as to classify the original as to its degree of sharpness. The evaluating means includes computer means, preferably in the form of a microprocessor, and a pair of channels establishing communication between the computer means and the scanning means. Each of the channels comprises a differentiating circuit and a maximum/minimum detector, and one of the channels further includes a low-pass filter. It is preferred for each channel to also be provided with an analog/digital converter. The channel with the low-pass filter is arranged to deliver a first maximum density gradient to the computer means for each scanned region of the original while the other channel is similarly arranged to deliver a second maximum density gradient to the computer means for each scanned region of the original. The computer means is designed to establish first values by calculating ratios between respective first and second maximum density gradients; to compare the first values with respective reference values so as to classify the original as to its degree of sharpness; and to generate a classifying signal indicative of the degree of sharpness of the original. Preferably, the computer means comprises a memory for the reference values.

The evaluating means may include an additional channel between the scanning means and the computer means, and such additional channel comprises a maximum/minimum detector. It is preferred for the additional channel to further include an analog/digital converter.

The novel features which are considered as characteristic of the invention are set forth in particular in the appended claims. The improved arrangement itself, however, both as to its construction and its mode of operation, together with additional features and advantages thereof, will be best understood upon perusal of the following detailed description of certain specific embodiments with reference to the accompanying drawings.

BRIEF DESCRIPTION OF THE DRAWINGS

FIG. 4a is a plot of the extreme positive values of density gradient as a function of position along the original of FIG. 3;

FIG. 4b is a plot of the magnitudes of the extreme negative values of density gradient as a function of position along the original of FIG. 3;

FIG. 4c is a plot of density range and minimum density as a function of position along the original of FIG. 3;

DESCRIPTION OF THE PREFERRED EMBODIMENTS

Figures 1, 2:
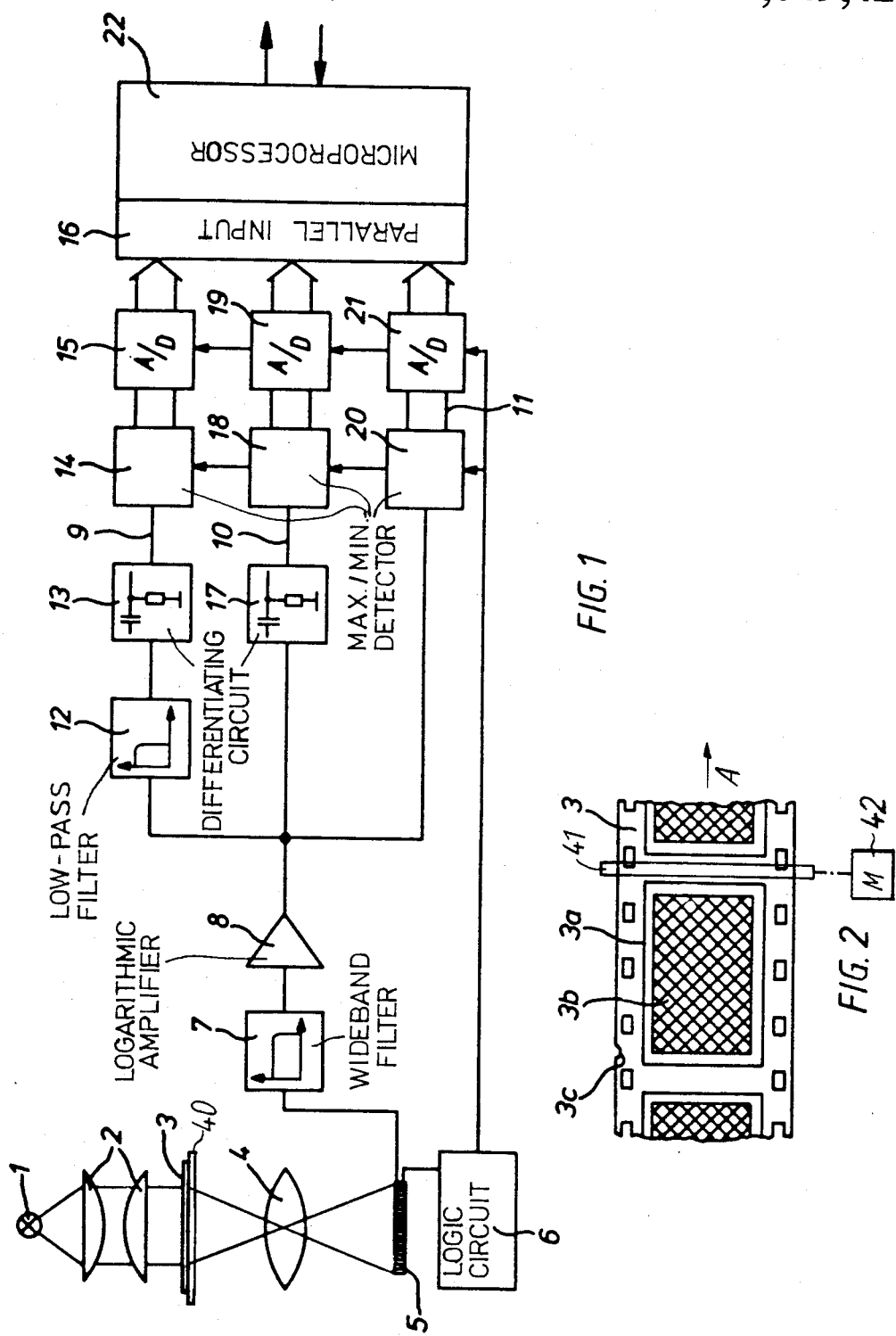
FIG. 1 schematically illustrates an arrangement according to the invention for determining the sharpness of originals such as exposed and developed frames of a film.
FIG. 2 illustrates a section of a film undergoing processing in the arrangement of FIG. 1.

FIG. 1 schematically illustrates an arrangement in accordance with the invention for determining the sharpness of originals constituting part of a web 3 of photosensitive material. The arrangement includes a scanning means or unit for scanning the originals and generating scanning signals representative of their densities. The arrangement also includes an evaluating means or unit for evaluating the scanning signals and reaching a conclusion as to the sharpness of each original based on the results of the evaluation. The sharpness of an original may be of importance, for example, in making a determination as to whether the original is worthwhile copying.

The scanning unit comprises a source 1 of illumination, as well as a set of condensers 2 between the source 1 and the web 3. The source 1 illuminates the web 3 via the condensers 2. The scanning unit further comprises a support 40 for the web 3, an objective 4 on that side of the web 3 remote from the condensers 2, and a sensing means in the form of a charge-coupled device 5.

During the scanning operation, the web 3 in FIG. 1 is transported in a direction normal to the plane of FIG. 1. Any suitable conveying means may be used to advance the web 3. As shown in FIG. 2, the conveying means is here in the form of a pair of rollers 41 which are driven by a motor 42. The direction of advance of the web 3 in FIG. 2 is indicated by the arrow A. The motor 42 may be designed to advance the web 3 continuously or, alternatively, the motor 42 may be in the form of a stepping motor which conveys the web 3 in steps.

The charge-coupled device 5 is made up of a linear array of photoelectric sensing elements or pixels, e.g., a linear array of 1024 photoelectric sensing elements or pixels, and extends transverse to the direction of advance A of the web 3. The scanning unit is designed to scan the web 3 line-by-line and, to this end, a strip-shaped or linear region of the web 3 is imaged onto the charge-coupled device 5 by the objective 4. This linear region parallels the charge-coupled device 5, and preferably has a width which equals or approximates the size of the smallest visually observable detail on the original being scanned. The charge-coupled device 5 is fixed, and the scanning operation is performed by moving the web 3 relative to the charge-coupled device 5.

FIG. 2 shows that the web 3 may be constituted by an elongated strip of film which carries a series of originals in the form of exposed and developed frames or negatives 3a. Each frame 3a has a dimension which extends transverse to the web 3 and to the direction of advance A of the latter, and the scanned, linear regions of the web 3 are parallel to this dimension, as well as to the charge-coupled device 5.

Each scanned, linear region advantageously traverses at least one-half of the transverse dimension or width of the respective frame 3a. However, the linear regions preferably extend neither across the full width of the web 3 nor across the full widths of the frames 3a. Similarly, it is preferred not to scan the entire length of a frame 3a. Instead, it is desirable to have an unscanned border between the scanned area of a frame 3a and each of the longitudinal edges of the latter, as well as between the scanned area of a frame 3a and each transverse edge thereof. This is illustrated in FIG. 2 where the scanned area of a frame 3a is identified by the reference numeral 3b and is crosshatched. The width of the unscanned border may, for instance, be of the order of 2 mm. Thus, for a frame 3a having dimensions of 24 mm × 36 mm, the size of the scanned area 3b would be about 20 mm × 32 mm. The sensing elements of the charge-coupled device 5 are then distributed along a span corresponding to an approximately 20 mm length of the scanned frame 3a.

The preceding dimensions of 24 mm × 36 mm for a frame 3a are only exemplary, and the frames 3a may have other dimensions also. For instance, the web 3 may be in the form of 135 type film containing transversely arranged frames 3a having dimensions of 18 mm × 24 mm. It is further possible to scan and evaluate disc film in accordance with the invention.

By providing each frame 3a with an unscanned border, scanning and evaluation of the edges of the frames 3a are avoided. This is of importance since the frame edges are capable of forming sharp images of certain objects such as, for example, an internal rim of a camera. Furthermore, the presence of an unscanned border restricts the scanned area of a frame 3a to that portion of the latter which presumably contains the most important part of the image.

The beginning and end of each frame 3a which is deemed sufficiently sharp to copy are marked by notches 3c. The notches 3c, which may be produced in any conventional manner, are formed at an edge of the web 3 in alignment with the respective frames 3a. The notches 3c are designed to be detected by non-illustrated detecting means of known type. The detecting means emits a signal in response to detection of a notch 3c thereby making it possible to locate the beginning and end of a respective frame 3a.

Returning to FIG. 1, the charge-coupled device 5 is designed to generate a scanning signal for each linear region of the web 3, and such signal is representative of the density of the respective region. The charge-coupled device 5 is controlled by a logic circuit 6, and the scanning signals emitted by the charge-coupled device 5 are transmitted to a wideband filter 7 in response to commands issued by the logic circuit 6. A logarithmic amplifier 8 is located downstream of the wideband filter 7 and receives the signals issuing from the latter. The logic circuit 6, the wideband filter 7 and the logarithmic amplifier 8 may all be considered to constitute part of the evaluating unit of the arrangement of FIG. 1.

Each output signal of the logarithmic amplifier 8 is divided among three channels 9,10,11 which likewise constitute part of the evaluating unit. The channel 9 is a so-called fuzzy channel, the channel 10 a so-called sharp channel, and the channel 11 a channel for determining the density range and minimum density of each region of an original being scanned.

The fuzzy channel 9 contains a low-pass filter 12 which functions to filter out the high frequency band or range of each signal entering the fuzzy channel 9. The low-pass filter 12 causes the signals which enter the fuzzy channel 9 to resemble signals from a fuzzy original, and the output signals of the low-pass filter 12 may thus be termed fuzzy signals. A differentiating circuit 13 is disposed downstream of the low-pass filter 12. The differentiating circuit 13 differentiates the fuzzy signals issuing from the low-pass filter 12 and, in turn, emits signals which represent the density gradients of the scanned regions of the originals. The output of the differentiating circuit 13 is connected with the input of a maximum/minimum detector 14 which is controlled by the logic circuit 6. Downstream of the maximum/minimum detector 14 is an analog/digital converter 15 which is also controlled by the logic circuit 6 and digitizes the density gradients derived from the maximum/minimum detector 14. From the analog/digital converter 15, the digitized density gradients are forwarded to a computer 22 via a parallel input 16. The computer 22 and the parallel input 16 again constitute part of the evaluating unit of the arrangement of FIG. 1.

It is preferred for the computer 22 to be provided with a memory. The computer 22 is advantageously in the form of a microprocessor such as, for example, the type marketed under the designation Falcon by the Digital Equipment Company.

The sharp channel 10 is identical to the fuzzy channel 9 except that the low-pass filter 12 is omitted. Thus, the sharp channel 10 contains a differentiating circuit 17, a maximum/minimum detector 18 situated downstream of the differentiating circuit 17, and an analog/digital converter 19 connected with the output of the maximum/minimum detector 18.

In the fuzzy channel 9, only a portion of each frequency modulated signal generated by the logarithmic amplifier 8 is differentiated in the differentiating circuit 13 since part of each signal is filtered out by the low-pass filter 12. On the other hand, each frequency modulated signal derived from the logarithmic amplifier 8 enters the differentiating circuit 17 of the sharp channel 10 in its entirety. The signals entering the differentiating circuit 17 of the sharp channel 10 may be termed sharp signals as opposed to the signals entering the differentiating circuit 13 of the fuzzy channel 9 which, as mentioned above, may be termed fuzzy signals.

The differentiating circuit 17 of the sharp channel 10 differentiates the sharp signals arriving from the logarithmic amplifier 8 and, in turn, generates signals representative of the density gradients of the scanned regions of the originals. The maximum/minimum detector 18, which is controlled by the logic circuit 6, processes these signals and transmits output signals to the analog/digital converter 19. The density gradients derived from the maximum/minimum detector 18 are digitized by the analog/digital converter 19, which is likewise controlled by the logic circuit 6, and subsequently forwarded to the computer 22 via the parallel input 6.

The channel 11 contains only a maximum/minimum detector 20, and an analog/digital converter 21 which is interposed between the maximum/minimum detector 20 and the parallel input 16 to the computer 22. Both the maximum/minimum detector 20 and analog/digital converter 21 are controlled by the logic circuit 6. The maximum/minimum detector 20 receives the output signal of the logarithmic amplifier 8 directly and is thus able to determine the density range, as well as the minimum density, of each region of an original being scanned. The analog/digital converter 21 digitizes the density range and minimum density which are then delivered to the computer 22 via the parallel input 16.

As indicated above, the logic circuit 6 is connected with the charge-coupled device 5, and also exercises direct control over the maximum/minimum detectors 14,18,20 as well as the analog/digital converters 15,19,21. The control function of the logic circuit 6 is as follows:

Upon completion of a full scanning cycle by the charge-coupled device 5, the extreme values stored in the maximum/minimum detectors 14,18,20 are forwarded to the respective analog/digital converters 15,19,21, and thereafter delivered to the computer 22. The minimum values delivered by detectors 14 and 18 correspond to the extreme values of the negative densiting gradient. After being converted to digital values they are converted to absolute magnitudes. After advance of the web 3 through a distance equal to the width of a scanning line, the extreme values are erased, and the next scanning cycle is initiated. As mentioned previously, the beginning and end of an original are detected by forming notches in alignment with the two ends thereof, and transporting the original by detecting means capable of sensing the notches and emitting signals in response to detection of a notch.

Figure 3:
FIG. 3 is an enlarged view of an exposed and developed original containing a partially fuzzy image.

FIG. 3 illustrates an example of an original which needs to be evaluated in order to determine whether it is sufficiently sharp to warrant making copies thereof. The portion of the original containing the most important part of the image exhibits the likenesses of two persons, and these likenesses are virtually entirely surrounded by unstructured atmosphere. The foreground, i.e., the bottom quarter of the original, contains a picture of part of the anatomy of an additional person, and this picture is fuzzy due to insufficient depth of focus. Similarly, the upper right-hand corner of the original exhibits a reproduction of part of another face, and such reproduction is likewise fuzzy because of insufficient depth of focus. The part of the face in the upper right-hand corner is only partially masked during sharpness determination. As regards the individuals in the central or main part of the image, it must be assumed that the owner of the original wishes to have a copy since, even though the likenesses are not very sharp, neither are they so fuzzy as to make a copy unwarranted.

FIGS. 4a-4c illustrate the scanning curves obtained by scanning the original of FIG. 3 along 256 lines FIGS. 4a and 4b are derived from the output values of the analog/digital converters 15 and 19 while FIG. 4c is derived from the output values of the analog/digital converter 21.

In FIG. 4a, the ordinate represents the maximum density gradient, that is, the extreme positive output values $dD/dx$ of the analog/digital converters 15,19. The abscissa represents position along the original of FIG. 3. The dashed curve 23 corresponds to the sharp channel 10 and is a plot of the 256 extreme positive output values $dD/dx$ of the analog/digital converter 19 as a function of position along the original of FIG. 3. The unbroken curve 24 corresponds to the fuzzy channel 9 and is a plot of the 256 extreme positive output values $dD/dx$ of the analog/digital converter 15 as a function of position along the original of FIG. 3.

In FIG. 4b, the ordinate represents the magnitudes of the extreme negative output values $dD/dx$ of the analog/digital converters 15,19, i.e., the magnitudes of the extreme negative values of the density gradient. The abscissa represents position along the original of FIG. 3. The dashed curve 25 corresponds to the sharp channel 10 and is a plot of the magnitudes of the 256 extreme negative output values $dD/dx$ of the analog/digital converter 19 as a function of position along the original of FIG. 3. The unbroken curve 26 corresponds to the fuzzy channel 9 and is a plot of the magnitudes of the 256 extreme negative output values $dD/dx$ of the analog/digital converter 15 as a function of position along the original of FIG. 3.

In FIG. 4c, the ordinate represents the density range delta D, as well as the minimum density $D_{min}$, of a respective scanned region. Both the density range delta D and the minimum density $D_{min}$ constitute output values of the analog/digital converter 21. The abscissa represents position along the original of FIG. 3. The dashed curve 27 is a plot of the 256 values of the density range delta D as a function of position along the original of FIG. 3. The unbroken curve 28 is a plot of the 256 values of the minimum density $D_{min}$ as a function of position along the original of FIG. 3.

Although the original of FIG. 3 was scanned along 256 lines in the present Example, the number of scanning lines, and hence the number of output values derived from each of the analog/digital converters 15,19,21, may be increased by reducing the width of the slit which is used to image linear regions of the original onto the charge-coupled device 5.

The direction from left to right in FIGS. 4a-4c corresponds to the direction from bottom to top in FIG. 3. The totally fuzzy foreground in the original of FIG. 3 is seen in the corresponding left-hand portions of the curves 23-26 of FIGS. 4a and 4b where no large density gradients are to be observed. The large peak about one-fourth of the distance along the original of FIG. 3 probably represents the somewhat sharper contour of the interior of the house inside which the picture constituting the original was taken. Up to the location of the large peak, the sharp curves 23,25 are generally close to the respective fuzzy curves 24,26. Beyond the location of the large peak, the sharp curves 23,25 generally lie well above the corresponding fuzzy curves 24,26. The large peak, and the accompanying increase in spacing between the sharp curves 23,25 and the respective fuzzy curves 24,26, coincide with a rise in the density range curve 27 of FIG. 4c to a maximum value where the curve 27 remains for the rest of the distance along the original of FIG. 3. The permanent increase in density range to a maximum value is attributable to the unstructured atmosphere surrounding the two individuals in the central or main part of the image. The shapes of the curves 23-26 in the vicinity of these individuals indicate a highly structured image having very large density differences. Overall, however, the curves 23-26 indicate that the original of FIG. 3 is worthwhile copying. The manner in which the data of FIGS. 4a and 4b is to be evaluated in order to demonstrate this is described below.

It will be observed that, in FIGS. 4a and 4b, the values of the density gradient for the fuzzy channel 9 are always smaller than the values for the sharp channel 10. The reason is that the low-pass filter 12 of the fuzzy channel 9 simulates a scanning area larger than is actually the case.

In order to determine whether the original of FIG. 3 is worthwhile copying, the 256 measurements for each of the sharp and fuzzy curves 23-26 of FIGS. 4a and 4b are evaluated statistically. To this end, each measurement for the sharp curve 23 is combined with the corresponding measurement for the fuzzy curve 24 to yield a sharpness value and, similarly, each measurement for the sharp curve 25 is combined with the corresponding measurement for the fuzzy curve 26 to yield a sharpness value. The sharpness values are calculated as follows:

$$\text{sharpness value} = \frac{(dD/dx)_{sc}}{(dD/dx)_{fc}} - 1$$

Here, $(dD/dx)_{sc}$ is the density gradient of a respective sharp curve 23,25 while $(dD/dx)_{fc}$ is the associated density gradient of the corresponding fuzzy curve 24,26. The sharpness value has a characteristic magnitude when a pair of measurements have the same value, that is, when the scanned region corresponding to such a pair of measurements is totally fuzzy. In this case, the magnitude of the sharpness value is zero.

The sharpness value may be approximated by the spacing between a respective sharp curve 23,25 and the corresponding fuzzy curve 24,26.

The sharpness values are now grouped for purposes of evaluation. Thus, the sharpness values are divided into 20 groups according to the density gradient of the respective sharp curve 23,25, i.e., all of the sharpness values in a group have the same density gradient $(dD/dx)_{sc}$. The magnitudes of the sharpness values in each group are then summed.

Figure 5:
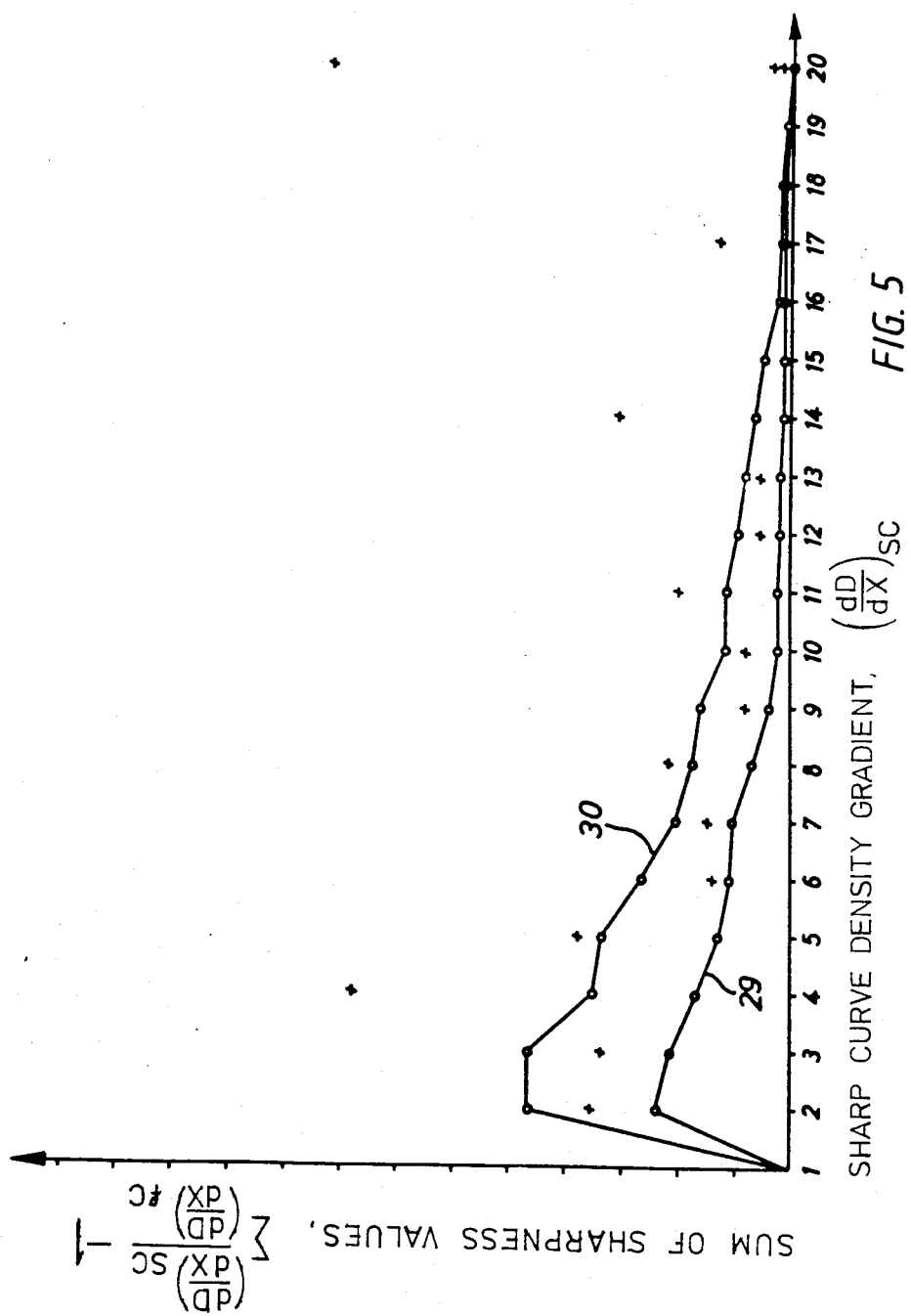
FIG. 5 is a graph containing a pair of reference curves for determining the sharpness of the original of FIG. 3 using the data of FIGS. 4a and 4b.

Referring to FIG. 5, the ordinate represents the sum of the sharpness values while the abscissa represents the density gradients of the sharp curves 23,25. The abscissa in FIG. 5 is numbered 1 to 20 in accordance with the division of the sharpness values into 20 groups. FIG. 5 shows that the sums obtained from the 512 sharpness values calculated for the original of FIG. 3, i.e., 256 sharpness values from the data of FIG. 4a and 256 sharpness values from the data of FIG. 4b, form a distribution of 20 groups along the axis representing the density gradients of the sharp curves 23,25.

A pair of curves 29,30 is illustrated in FIG. 5. The lower curve 29 reaches a maximum value of about 2.5 scale units at Group 2 while the upper curve 30 has a maximum value of about 4.5 scale units at Groups 2 and 3. After reaching their maximum values, the curves 29,30 more or less continuously drop off towards zero as the Group number increases to 20. If the sum of the sharpness values for each of the Groups 1-20 is plotted in FIG. 5, there will be sums which lie between the curves 29,30, and sums which are located above the curve 30. Thus, the sums for the Groups 4, 5, 8, 11, 14, 17 are disposed above the curve 30 while the sums for the remaining Groups lie between the curves 29,30.

The curve 30 is established empirically using a large number of originals which have been visually classified as fuzzy. Each such original is scanned to permit calculation of sharpness values. The sharpness values for a respective original are grouped, and the sum of the sharpness values is determined for each group. The sums for all of the originals are plotted as in FIG. 5, and a curve which envelopes all of the sums is established. This curve is taken as the curve 30.

It follows that an original for which the sum of the sharpness values of at least one group lies above the curve 30 may be immediately classified as sharp. On the other hand, an original for which the sums of the sharpness values of all groups are located below the curve 29 may be reliably classified as fuzzy. If, in contrast, the sums of the sharpness values of many groups of an original are disposed between the curves 29 and 30, the original represents a borderline case for which an operator of a copying apparatus can make special adjustments.

The curves 29 and 30 may be termed reference curves, and the data or reference values necessary to plot the curves 29,30 may be stored in the memory of the computer 22. The spacing between the curves 29,30 may be decreased by appropriate programming of the memory and, similarly, the curves 29,30 may be shifted up or down by suitably programming the memory.

The computer 22 is designed to generate a classifying signal representative of the sharpness of an original being evaluated.

The procedure described above for determining the sharpness of an original takes account of the recognition that a single large jump in density, i.e., a large density gradient in comparison to that of the fuzzy curve 24 or 26, is a more reliable indicator of a sharp original than a multiplicity of smaller jumps in density. From the shape of the curve 30, it will be apparent that a small number of jumps in density is already sufficient to cause the sum of the sharpness values in each of the Groups 16-20 to lie above the curve 30.

The statistical evaluation of the measurements used to plot the curves 23-26 of FIGS. 4a and 4b may be refined by grouping the sharpness values derived from these measurements in a matrix. Thus, instead of dividing the sharpness values into 20 groups according to the density gradient of the respective sharp curve 23,25, the sharpness values are divided into approximately 400 groups according to both the density gradient of the respective sharp curve 23,25, and the density range of the respective scanned region of the original, i.e., the difference between the maximum and minimum densities of the respective scanned region. The magnitudes of the sharpness values in each group are then summed.

Figure 6:
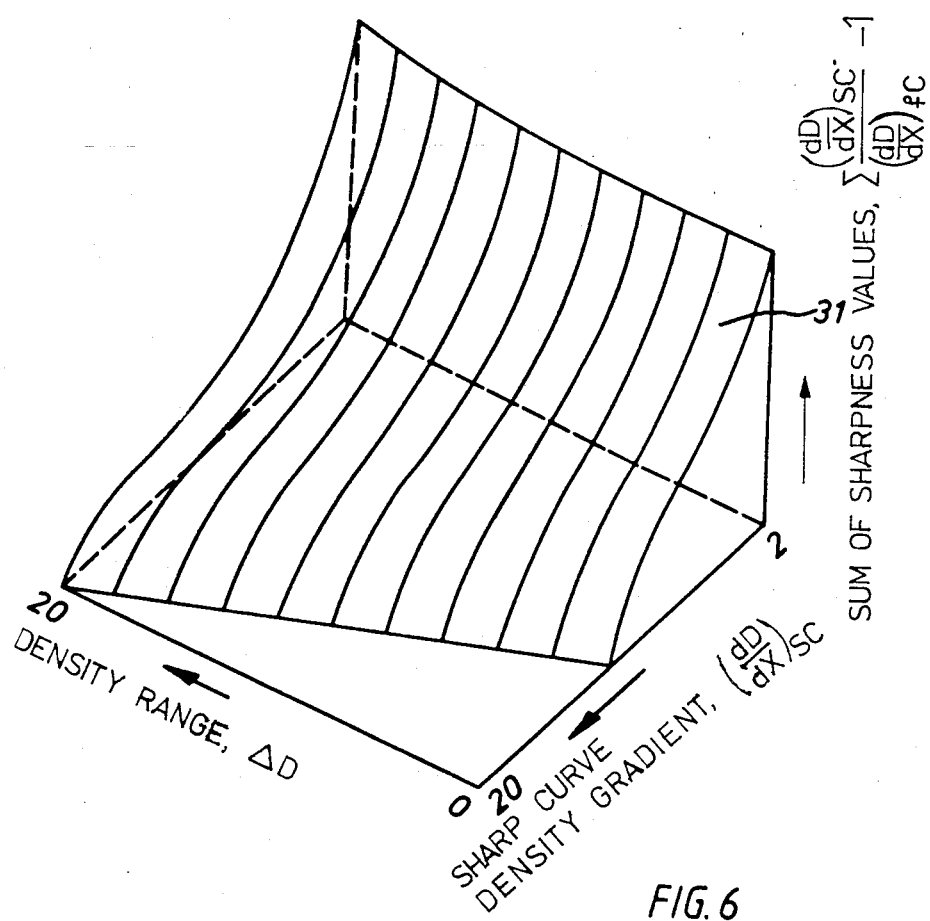
FIG. 6 is a graph containing a reference surface for determining the sharpness of the original of FIG. 3 using the data of FIGS. 4a–4c.

FIG. 6 illustrates a plot which may be used to determine the sharpness of the original of FIG. 3 from the sums of the sharpness values. The plot of FIG. 6 is three-dimensional, and hence contains three axes. One of these axes originates in the lower right-hand corner and extends slightly upward and to the left. This axis represents the density ranges delta D of the scanned regions of the original, and is numbered 0 to 20 in increments of 1 to signify the fact that the sharpness values are divided into 21 groups according to the density range of the respective scanned region of the original. A second axis originates in the middle right-hand corner and extends downward and to the left so that it intersects the density range axis. The second axis represents the density gradients of the sharp curves 23,25, and is numbered 2 to 18 in increments of 1 to signify the fact that the sharpness values are here divided into 19 groups according to the density gradient of the respective sharp curve 23,25. The final axis extends vertically and represents the sum of the sharpness values.

The sum of the sharpness values in each group of the matrix defined by the density range and density gradient axes is compared with a three-dimensional reference surface 31. The reference surface 31 is established empirically in the same manner as the reference curve 30 of FIG. 5. Thus, a large number of originals which have been visually classified as fuzzy are scanned to permit calculation of sharpness values. The sharpness values for a respective original are grouped in a matrix, and the sum of the sharpness values is determined for each group. The sums for all of the originals are plotted as in FIG. 6, and a surface which envelopes all of the sums is established. This surface is taken as the reference surface 31. In the same manner a second surface (not shown) may be established a certain percentage, for example 30%, lower than the first reference surface 31.

The reference surface 31 defines a reference value for each of the approximately 400 groups of sharpness values. All that is required in evaluating the sums of the sharpness values is to determine whether the sums exceed the respective reference values or not. Further evaluations with the lower surface may be executed in accordance with the examination of FIG. 5.

It will be recalled that 512 sharpness values were calculated for the original of FIG. 3, i.e., 256 sharpness values from the data of FIG. 4a and 256 sharpness values from the data of FIG. 4b. Since 512 sharpness values constitute an insufficient population for proper statistical analysis when the sharpness values are divided into 400 groups, the result of the evaluation of the original of FIG. 3 in accordance with FIG. 6 has a relatively low probability. In order to perform a proper statistical analysis, the number of groups must be reduced or the number of sharpness values increased.

The data or reference values necessary to plot the reference surface 31 of FIG. 6 may again be stored in the memory of the computer 22.

A compromise between the procedure of FIG. 5 and the procedure of FIG. 6 is possible. This compromise procedure involves replacing the generalized reference curve 30 of FIG. 5 with a reference curve established using originals which have the same density range as the original under investigation. The memory of the computer 22 here stores data for a series of reference curves each of which is valid for a specific density range.

According to the compromise procedure, sharpness values are calculated as before. In addition, the density range of the original under investigation is determined. The sharpness values are divided into 20 groups, and the sum of the sharpness values in each group is calculated. The sums of the sharpness values are now compared with a reference curve similar to the curve 30 of FIG. 5 but developed from originals having the same density range as the original being evaluated. By comparing the sums of the sharpness values with a reference curve valid for the particular density range of the original under investigation, a good evaluation of the original as to whether it is sharp or fuzzy may be obtained.

The three evaluation procedures described above are based on summation of the sharpness values. However, instead of summing the sharpness values in each group, it is possible to count the sharpness values in the respective groups, and to weight the number of sharpness values in each group with a factor for the average magnitude of the sharpness values of the respective group.

Essential features of all evaluation procedures according to the invention are scanning of an original under investigation at a multiplicity of regions; calculating at least one sharpness value for each region which relates an extreme density gradient of the region, i.e., a density gradient derived from the sharp channel 10, to a corresponding extreme density gradient of the same region when made artificially fuzzy by the low-pass filter 12 of the fuzzy channel 9; and statistically evaluating the sharpness values employing reference values which are a function of the density ranges of the respective regions and/or a function of the density gradients derived from the sharp channel 10.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A method of determining the sharpness of an original comprising the steps of:
   (a) scanning a series of linear regions of said original;
   (b) generating a scanning signal for each of said regions which is representative of the density of the respective region;
   (c) processing each of said scanning signals to yield a sharp signal and a fuzzy signal;
   (d) deriving a maximum density gradient from each of said sharp signals and each of said fuzzy signals;
   (e) establishing a series of first values from said maximum density gradients, the establishing step including calculating the ratio between the maximum density gradient of each sharp signal and the maximum density gradient of the corresponding fuzzy signal; and
   (f) classifying said original as to its degree of sharpness by comparing said first values with respective reference values which are a function of the density gradients of said sharp signals.

2. The method of claim 1, wherein the scanning step is performed photoelectrically.

3. The method of claim 1, wherein the processing step comprises dividing each scanning signal into a pair of signals, and filtering out the high frequency range of one signal of each pair to thereby obtain the respective fuzzy signal, the other signal of each pair constituting the respective sharp signal.

4. The method of claim 1, wherein the deriving step comprises differentiating the respective sharp and fuzzy signals.

5. The method of claim 1, wherein said original is classified as sharp when at least one of said first values exceeds the respective reference value.

6. The method of claim 1, wherein the width of each of said regions is of the order of the smallest visually observable detail of said original.

7. The method of claim 1, said original having a transverse dimension; and wherein each of said regions traverses at least one-half of said dimension.

8. The method of claim 1, comprising the step of conveying said original along a predetermined direction during the scanning step, said regions extending transverse to said direction.

9. The method of claim 1, wherein said original constitutes part of an elongated web of photosensitive material having a series of originals, and said regions extend transversely of said web.

10. The method of claim 1, wherein the scanning step is performed using a stationary, linear array of sensing elements, and said regions substantially parallel said array.

11. The method of claim 1, said maximum density gradients constituting extreme positive values of density gradient; and further comprising the step of deriving an extreme negative value of density gradient from each of said sharp signals and each of said fuzzy signals, the absolute magnitudes of said extreme negative values being employed in classifying said original as to its degree of sharpness.

12. The method of claim 11, wherein the ratio between the absolute magnitude of the extreme negative value of each sharp signal and the absolute magnitude of the extreme negative value of the corresponding fuzzy signal is calculated.

13. The method of claim 1, wherein the establishing step comprises grouping said ratios according to the density gradients of the respective sharp signals, and summing the ratios of each group, the classifying step being performed by comparing the sums with a reference curve representing sum of the ratios as a function of the density gradients of said sharp signals.

14. The method of claim 13, comprising the step of storing a multiplicity of reference curves representing sum of the ratios as a function of the density gradients of said sharp signals, the respective curves being designed for use with originals having different density ranges, and the classifying step including selecting the reference curve corresponding to the density range of said original.

15. The method of claim 13, wherein said reference curve is derived by performing the scanning, generating, processing, deriving and establishing steps for a multiplicity of visually fuzzy originals, and developing a curve which envelopes all sums of the ratios for said fuzzy originals, the curve obtained from the developing step constituting said reference curve.

16. The method of claim 1, wherein the establishing step comprises grouping said ratios according to both the density gradients of the respective sharp signals and the density ranges of the respective regions, and summing the ratios of each group, the classifying step being performed by comparing the sums with a reference surface representing sum of the ratios as a function of both the density gradients of the respective sharp signals and the density ranges of the respective regions.

17. The method of claim 16, wherein said reference surface is derived by performing the scanning, generating, processing, deriving and establishing steps for a multiplicity of visually fuzzy originals, and developing a surface which envelopes all sums of the ratios for said fuzzy originals, the surface obtained from the developing step constituting said reference surface.

18. An arrangement for determining the sharpness of an original comprising:
(a) scanning means for scanning linear regions of the original and generating scanning signals representative of the densities of the respective regions; and
(b) evaluating means for evaluating the scanning signals so as to classify the original as to its degree of sharpness, said evaluating means including computer means, and a pair of channels establishing communication between said computer means and said scanning means, each of said channels comprising a differentiating circuit and a maximum/minimum detector, and one of said channels further including a low-pass filter, said one channel being arranged to deliver a first maximum density gradient to said computer means for each scanned region of the original, and the other of said channels being arranged to deliver a second maximum density gradient to said computer means for each scanned region of the original, said computer means being designed to establish first values by calculating ratios between respective first and second maximum density gradients, to compare the first values with respective reference values so as to classify the original as to its degree of sharpness, and to generate a classifying signal indicative of the degree of sharpness of the original.

19. The arrangement of claim 18, wherein said scanning means comprises a charge-coupled device having a linear array of sensing elements.

20. The arrangement of claim 19, comprising conveying means for advancing the original along a predetermined direction; and wherein said charge-coupled device is arranged transverse to said predetermined direction.

21. The arrangement of claim 18, wherein said scanning means comprises a support for the original.

22. The arrangement of claim 18, wherein each of said channels further comprises an analog/digital converter.

23. The arrangement of claim 18, comprising an additional channel between said scanning means and said computer means, said additional channel including a maximum/minimum detector.

24. The arrangement of claim 23, wherein said additional channel further comprises an analog/digital converter.

25. The arrangement of claim 18, wherein said computer means comprises a memory for the reference values.

26. The arrangement of claim 18, wherein said computer means comprises a microprocessor.

* * * * *